United States Patent
Huang et al.

(10) Patent No.: US 11,881,732 B2
(45) Date of Patent: Jan. 23, 2024

(54) ACTIVE RECEIVER OVERVOLTAGE AND OVERPOWER PROTECTION IN WIRELESS POWER TRANSFER

(71) Applicant: Renesas Electronics America Inc., Milpitas, CA (US)

(72) Inventors: Jiangjian Huang, San Jose, CA (US); Hulong Zeng, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 419 days.

(21) Appl. No.: 17/147,916

(22) Filed: Jan. 13, 2021

(65) Prior Publication Data
US 2022/0224137 A1 Jul. 14, 2022

(51) Int. Cl.
H02J 7/00 (2006.01)
H02J 50/00 (2016.01)
H02J 50/80 (2016.01)
H02J 50/10 (2016.01)

(52) U.S. Cl.
CPC ........ *H02J 7/00308* (2020.01); *H02J 50/005* (2020.01); *H02J 50/10* (2016.02); *H02J 50/80* (2016.02)

(58) Field of Classification Search
USPC .................. 320/106, 107, 108, 109, 110, 112
See application file for complete search history.

(56) References Cited

U.S. PATENT DOCUMENTS

| | | | |
|---|---|---|---|
| 2017/0141604 A1* | 5/2017 | Park | H02J 50/12 |
| 2018/0159371 A1* | 6/2018 | Kim | H02J 50/80 |
| 2022/0224137 A1* | 7/2022 | Huang | H02J 50/005 |
| 2022/0320913 A1* | 10/2022 | Xu | H02J 7/0047 |

FOREIGN PATENT DOCUMENTS

WO WO-2018199671 A1 * 11/2018 ............ H02J 50/80

* cited by examiner

*Primary Examiner* — Brian Ngo
(74) *Attorney, Agent, or Firm* — SCULLY, SCOTT, MURPHY & PRESSER, P.C.

(57) ABSTRACT

An apparatus, a method and a non-transitory computer-readable storage medium storing a program for controlling power receiving operation. The apparatus includes a controller configured to compare a frequency of an electric current generated by a voltage induced in a power receiving circuit by a magnetic field generated by a power transmitting apparatus, against a frequency threshold to determine whether the frequency is equal to or below the frequency threshold, and in response to determining that the frequency is equal to or below the frequency threshold, control a communications circuit to communicate a control command message instructing the power transmitting apparatus to modify a power charge signal used to provide the magnetic field in a manner for protecting the apparatus.

20 Claims, 5 Drawing Sheets

ACTIVE RECEIVER OVERVOLTAGE AND OVERPOWER PROTECTION IN WIRELESS POWER TRANSFER

FIELD

The present invention relates generally to power charging systems, and in particular, wireless power charging systems for electronic devices. More particularly, the present invention relates to an apparatus, a method and a non-transitory computer readable medium storing a program for dynamically providing overvoltage and over power protection for a power receiver integrated circuit in electronic devices subject to a wireless transfer of power.

BACKGROUND

Wireless power charging devices and systems are becoming more prevalent and are appearing in varied forms. There are three basic categories of device chargers: desktop chargers, power banks, and embedded chargers. Desktop chargers may be in the form of a charging pad or stand. Power banks are similar but are designed for travel and contain batteries to provide power when it cannot be plugged in to an outlet. Embedded chargers may be built into objects, e.g., furniture, automobiles, other appliances, or provided in public locations. The largest demand for chargers is for home use, but the deployment of public chargers is abundant.

There are different standards currently in use for wireless transfer of power. An example of such standards is the Qi® (registered trademark) standard (hereinafter "Qi standard") by the Wireless Power Consortium found at (www.wirelesspowerconsortium.com). The Qi standard defines an interface standard for wireless power transfer that ensures the interoperability of devices that conform to the Qi standard.

Typically, a wireless power transfer system uses magnetic induction to transfer power from a power transmitter of a wireless power charging device to a power receiver contained within the electric device being charged (e.g., a mobile device) when it is placed in proximity to the power transmitter. In the wireless power transfer system, an alternating current (AC) is applied to a power transmitting coil in a state where the power transmitting coil provided in the power transmitter is disposed proximate to a power receiving coil provided to the power receiver, and an alternating electromotive force (voltage) is induced in the power receiving coil of the power receiver to generate an alternating current in the power receiver.

One current technique to protect a power receiver of an electronic device being charged by wireless power transfer from over voltage and over power is based on an absorption technique. Such a technique requires adding a resistive load directly on the charging voltage (Vrect) over voltage protection (OVP) signal. The temporary excessive power can be absorbed by the resistive load, while communication is not affected. However, the size of the resistive load can be relatively large and the amount of excessive power varies across different brands of power transmitter. It is hard for one resistive load to cover all cases especially when minimizing layout area is a crucial requirement.

Another current technique to protect a power receiver of an electronic device being charged by wireless power transfer from over voltage and over power is based on power termination. In an example, such a technique requires the electronic device to send a command, e.g., an End of Power Transfer (EPT) packet, to the power transmitter, and the power transmitter terminates the power transmission actively. In another example, such a technique requires the electronic device to stop sending any packet to the power transmitter and wait for a timeout as a way to protect the power receiver. In this example, the communication time for a packet to be received is in tens of millisecond (ms) range, which means this technique can only respond to ms range dynamics. Further, there may be error in the decoding of the EPT packet at the power transmitter leading to continuation of power transfer even after the EPT packet is sent thereby resulting in failure to protect the power receiver from over voltage and over power.

SUMMARY

The following summary is merely intended to be exemplary. The summary is not intended to limit the scope of the claims.

According to an aspect, an apparatus for controlling power receiving operation is provided. The apparatus comprises: a controller configured to: compare a frequency of an electric current generated by a voltage induced in a power receiving circuit by a magnetic field generated by a power transmitting apparatus, against a frequency threshold to determine whether the frequency is equal to or below the frequency threshold; and in response to determining that the frequency is equal to or below the frequency threshold, control a communications circuit to communicate a control command message instructing the power transmitting apparatus to modify a power charge signal used to provide the magnetic field in a manner for protecting the apparatus.

According to a further aspect, a non-transitory computer-readable storage medium storing a program for controlling power receiving operation of an apparatus is provided. The program causes a processor to at least perform: comparing a frequency of an electric current generated by a voltage induced in a power receiving circuit by a magnetic field generated by a power transmitting apparatus, against a frequency threshold to determine whether the frequency is equal to or below the frequency threshold; and in response to determining that the frequency is equal to or below the frequency threshold, controlling a communications circuit to communicate a control command message instructing the power transmitting apparatus to modify a power charge signal used to provide the magnetic field in a manner for protecting the apparatus.

According to a further aspect, a method for controlling power receiving operation of an apparatus is provided. The method comprises comparing a frequency of an electric current generated by a voltage induced in a power receiving circuit by a magnetic field generated by a power transmitting apparatus, against a frequency threshold to determine whether the frequency is equal to or below the frequency threshold; and in response to determining that the frequency is equal to or below the frequency threshold, controlling a communications circuit to communicate a control command message instructing the power transmitting apparatus to modify a power charge signal used to provide the magnetic field in a manner for protecting the apparatus.

Other objects and novel features will become apparent from the description of this specification and the accompanying drawings.

DETAILED DESCRIPTION

Figure 1:
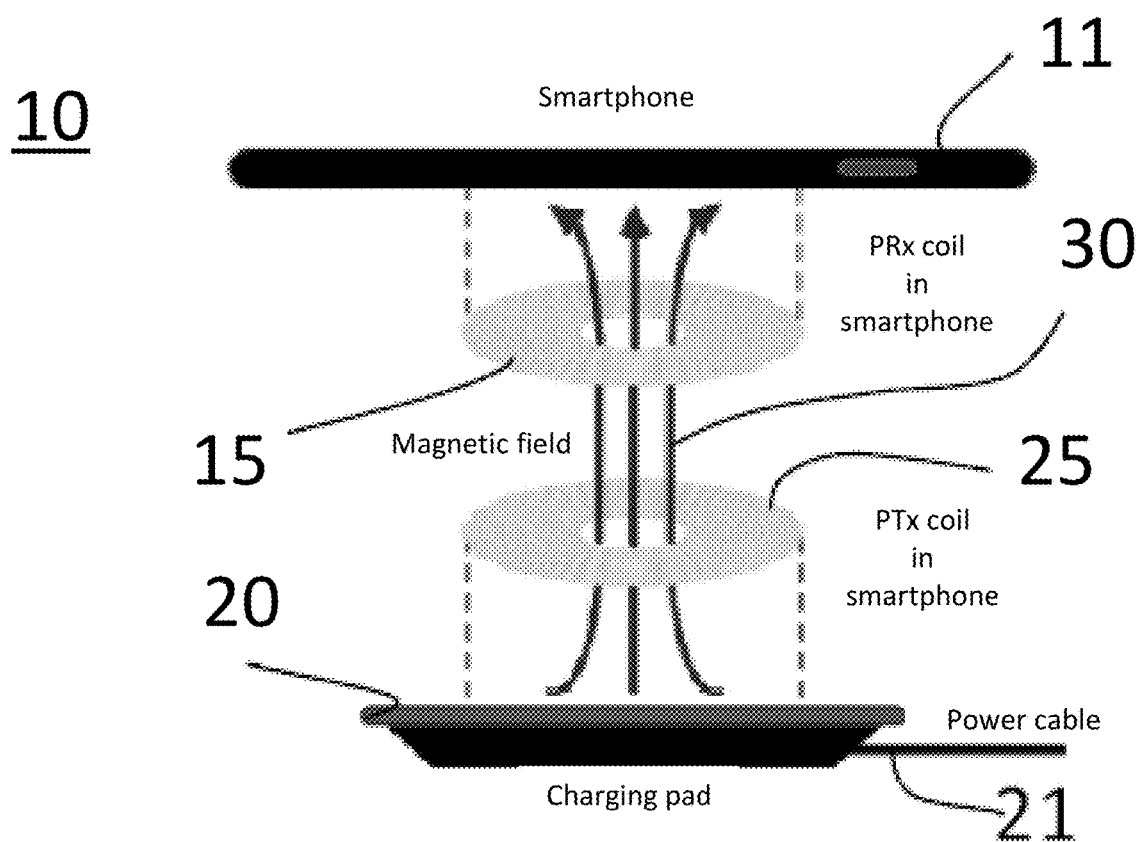
FIG. 1 depicts an overview of a wireless power charging system in which the present embodiments are incorporated.

FIG. 1 depicts an overview of a wireless power charging system 10 in which the present embodiments are incorporated. As shown in FIG. 1, the wireless power charging system 10 can include a power transmitting/charging pad or stand 20, a power cable 21 through which the power transmitting/charging pad or stand 20 receives electrical power, and an electronic device 11, e.g., a mobile phone. The electronic device 11 can be physically located on or in proximity to the power transmitting/charging pad or stand 20 during a wireless charging process described below.

In the wireless power charging system 10, electromagnetic induction is employed to wirelessly transfer power to a power receiver (PRx) subsystem contained within the electronic device 11 when the electronic device 11 is placed on top of or in proximity to a power transmitter (PTx) subsystem contained within the power transmitting/charging pad or stand 20.

As further shown in FIG. 1, the power transmitter (PTx) subsystem at the power transmitting/charging pad or stand 20 can include a transmitting power signal coil 25 and the power receiver (PRx) subsystem at the electronic device 11 can include a suitably positioned charging coil 15. As shown in FIG. 1, the basic physical principle that governs wireless power transfer specification in the wireless power charging system 10 is magnetic induction: the phenomenon that a time-varying magnetic field generates an electromotive force in a suitably positioned inductor. This electromotive force produces a voltage across the terminals of a coil-shaped inductor, and is used to drive the electronics of an appropriate load to which it is connected.

When charging begins, the power transmitter (PTx) subsystem runs an alternating current (AC) through the transmitting power signal coil 25 to generate a time-varying magnetic field 30 in accordance with Faraday's law. This time-varying magnetic field 30 is in turn picked up by the charging coil 15 of the power receiver (PRx) subsystem and induces an electromotive force (voltage) in the suitably positioned charging coil 15. This electromotive force produces a voltage across the terminals of the charging coil 15 to drive current in the charging coil 15. The power receiver (PRx) subsystem converts the power received back to AC electric current which is used by an electrical load.

The amount of power transmitted is based on the condition of the load, e.g., the state of the battery being charged. For example, the receiver communicates requests to the power charge transmitter subsystem to vary the power as the load changes. How the power transmitter (PTx) subsystem handles the request depends upon the transmitter, e.g., can decrease the input voltage or change the switching frequency.

Figure 2:
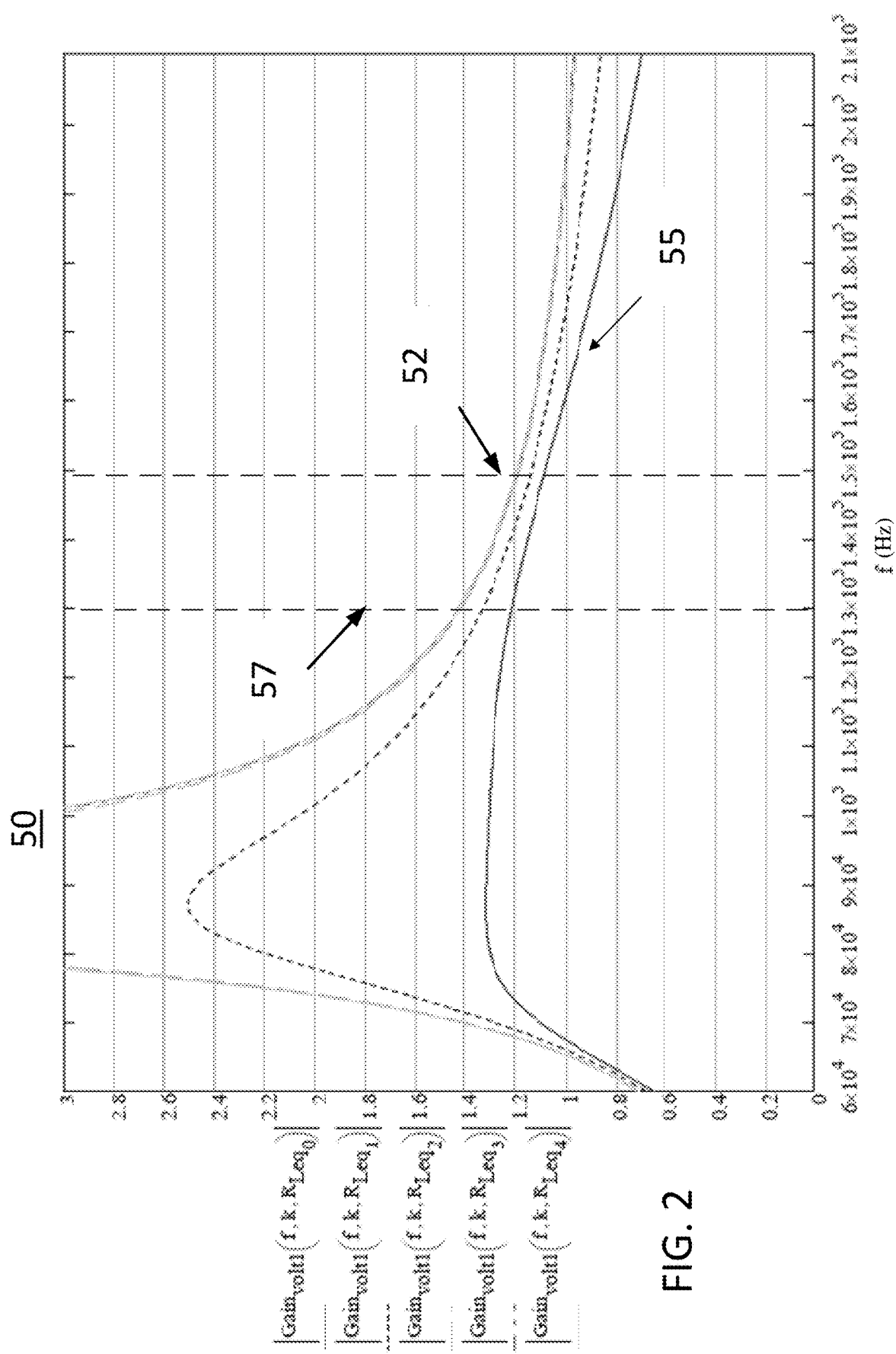
FIG. 2 shows a plot depicting the gain of a wireless power charging system versus a switching frequency of the power transmitter signal.

FIG. 2 shows a plot 50 depicting several gain curves 55 of different power transmitter (PTx) subsystems of different wireless power charging systems versus a switching frequency of power transmitter signals. In wireless power transfer, one effective way to prevent over voltage/power condition at the power receiver (PRx) subsystem is limiting the switching frequency of the alternating current to a power transmitting coil of the power transmitter (PTx) subsystem. In the plot 50 of FIG. 2, in certain operating modes, the power transmitter (PTx) subsystem uses both an input voltage (Y-axis) and switching frequency (X-axis) to control the gain of the wireless power charging signal and consequently the gain of the power charge signal received at the power receiver (PRx) subsystem. As shown in FIG. 2, the power transmitter (PTx) subsystem has an operating frequency 52 which is a switching frequency of the AC power charge signal set for nominal wireless charging operations such that the output gain of the wireless power charge signal received at the load is limited without possibility of reaching an over voltage/power condition at the power receiver (PRx) subsystem. However, different transmitters can be controlled to reach a different minimum operating AC power charge frequency 57. That is, different types and brands of power transmitter (PTx) subsystems of power chargers can have different minimum operating AC power charge frequencies 57. When an amount of power is transmitted that is greater than an amount of power consumed by a load of the power receiving side, heat caused by a difference power loss and a breakdown caused by an overvoltage can occur. That is, at the power transmitter (PTx) subsystem, a particular setting combination of high input voltage and a low or a minimum switching frequency poses a high risk of over voltage and over power at the power receiver (PRx) subsystem.

Figure 3:
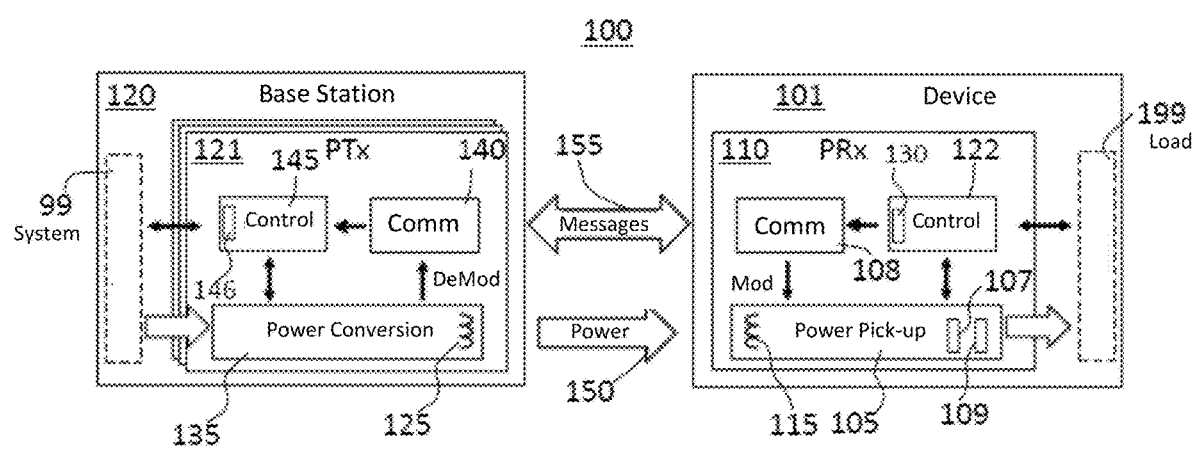
FIG. 3 depicts an exemplary wireless power transfer system in which an embodiment to control a transmitting power value so as to safely transmit power with high efficiency is employed.

In one embodiment, FIG. 3 depicts a wireless power transfer system 100 for controlling a transmitting power value so as to safely transmit power with high efficiency. The wireless power transfer system 100 can be compliant with the Qi standard, for example.

The wireless power transfer system 100 can include a base station 120 implemented as a power charger base or power charge stand that includes a power transmitter (PTx) subsystem 121, and a power receiver (PRx) subsystem 110 implemented in an electronic device 101. In embodiments, power receiver (PRx) subsystem 110 may be a system-on-chip receiver design and/or include circuitry integrating one or more integrated circuits (ICs). The power receiver (PRx) subsystem 110 can include, for example, wireless power receiver ICs that comply with the Qi standard, such as a P9222-R integrated single-chip wireless power receiver IC (PRx) available from Renesas Electronics Corporation. Other integrated circuit chips in compliance with the Qi standard that can be used include P9382, P9415 and P9418 products also available from Renesas Electronics Corporation.

As shown conceptually in FIG. 3, at the base station 120, the power transmitter (PTx) subsystem 121 can include one or more power transmitting coils 125 that make power available to the electronic device 101, a power conversion (modulation/demodulation) unit 135, a communications transceiver unit 140 and a control (controller) unit 145. The power conversion (modulation/demodulation) unit 135 employs DC-to-AC converter(s) and the power transmitting coil(s) 125 wirelessly transmits AC power signals at a specified amplitude and frequency to a receiver coil 115 in the power receiver (PRx) subsystem 110 of the electronic device 101. The control (controller) unit 145 (e.g., a programmed microprocessor), receives and decodes messages from power receiver (PRx) subsystem 110, configures the appropriate power transmitting coil 125, executes the relevant power control algorithms and protocols, and drives the frequency of the AC waveform to control the power transfer. Control (controller) unit 145 also interfaces with other subsystems 99 of the base station 120 for example, for user interface purposes.

The power receiver (PRx) subsystem 110 of the electronic device 101 is configured to acquire near field inductive power 150 and to control its availability at its output. Power receiver (PRx) subsystem 110 can include receiver coil 115, a power pick-up (circuit) unit 105, a communications transceiver unit 108 and a control (controller) unit 122. In an embodiment, control units 122 or 145 can be any suitable type of processor(s), such as one or more microprocessors, microcontrollers (MCUs), digital signal processors (DSPs), or the like, with supporting hardware and/or firmware (e.g., memory, programmable I/Os, etc.), as would be appreciated by one of ordinary skill in the art.

In operation, the receiver coil 115 receives the AC power signals 150 at a specific frequency transmitted from the power transmitting coil 125 of the power transmitter (PTx) subsystem 121. Coils 115, 125 form a strongly-coupled inductor pair (magnetic induction transmission), or alternately form a loosely-coupled inductor pair (magnetic resonance transmission). The wireless power transfer system 100 employing near-field magnetic induction between coils 115, 125 can be a free-positioning or a magnetically-guided type of system.

At the power transmitter (PTx) subsystem 121, signal processing circuitry of the power conversion unit 135 generates the AC power signals at a specified operating point, e.g., amplitude, frequency, and duty cycle, for transmission via the power transmitting coil 125. The power pick-up (circuit) unit 105 of the power receiver (PRx) subsystem 110 receives the AC power signals and converts the AC power signals received into signals for directly charging an electrical device load 199, e.g., storing charge in a local energy storage device such as one or more rechargeable batteries, at a constant current or constant voltage charging profile at the electronic device 101. For example, at the power pick-up (circuit) unit 105, rectifier circuits (e.g., a rectification circuit consisting of four diodes in a full bridge configuration) convert the received AC waveform to a DC power level for use in charging.

At the power transmitter (PTx) subsystem 121, the communications transceiver unit 140 can perform two-way communication with the power receiver (PRx) subsystem 110 via the communications transceiver unit 108. In embodiments, control (controller) unit 122 of the power receiver (PRx) subsystem 110 employs logic for controlling power transfer and communication of messages 155 with the power transmitter (PTx) subsystem 121. For example, for controlling power transfer, communications transceiver unit 140 performs a demodulation of modulated control signals (packets) communicated by and received from the communications transceiver unit 108 at the power receiver (PRx) subsystem 110. In an embodiment, control (controller) unit 145 can include a program module 146 including instructions for executing an application process based on data received by the communications transceiver unit 140.

In inductive charging systems according to, for example, the Qi standard, throughout the power transfer phase, the power transmitter (PTx) subsystem 121 and the power receiver (PRx) subsystem 110 can form a closed-loop system to control the amount of power that is transferred. In an embodiment, the amount of power transferred to the electronic device 101 is controlled by the power receiver (PRx) subsystem 110. That is, for wireless charging, an increase/decrease of the transmitting power is requested in a one-way communication from the power receiver (PRx) subsystem 110 to the power transmitter (PTx) subsystem 121 in order for the receiving side to have an optimal amount of power, as explained in more detail below. The power transmitting side controls the transmitted power value in accordance with the request received from the power receiver (PRx) subsystem 110. In embodiments, the power receiver (PRx) subsystem 110 provides for power transfers up to 5 W, however in embodiments, this can be extended to power transfers greater than 5 W.

Figure 4:
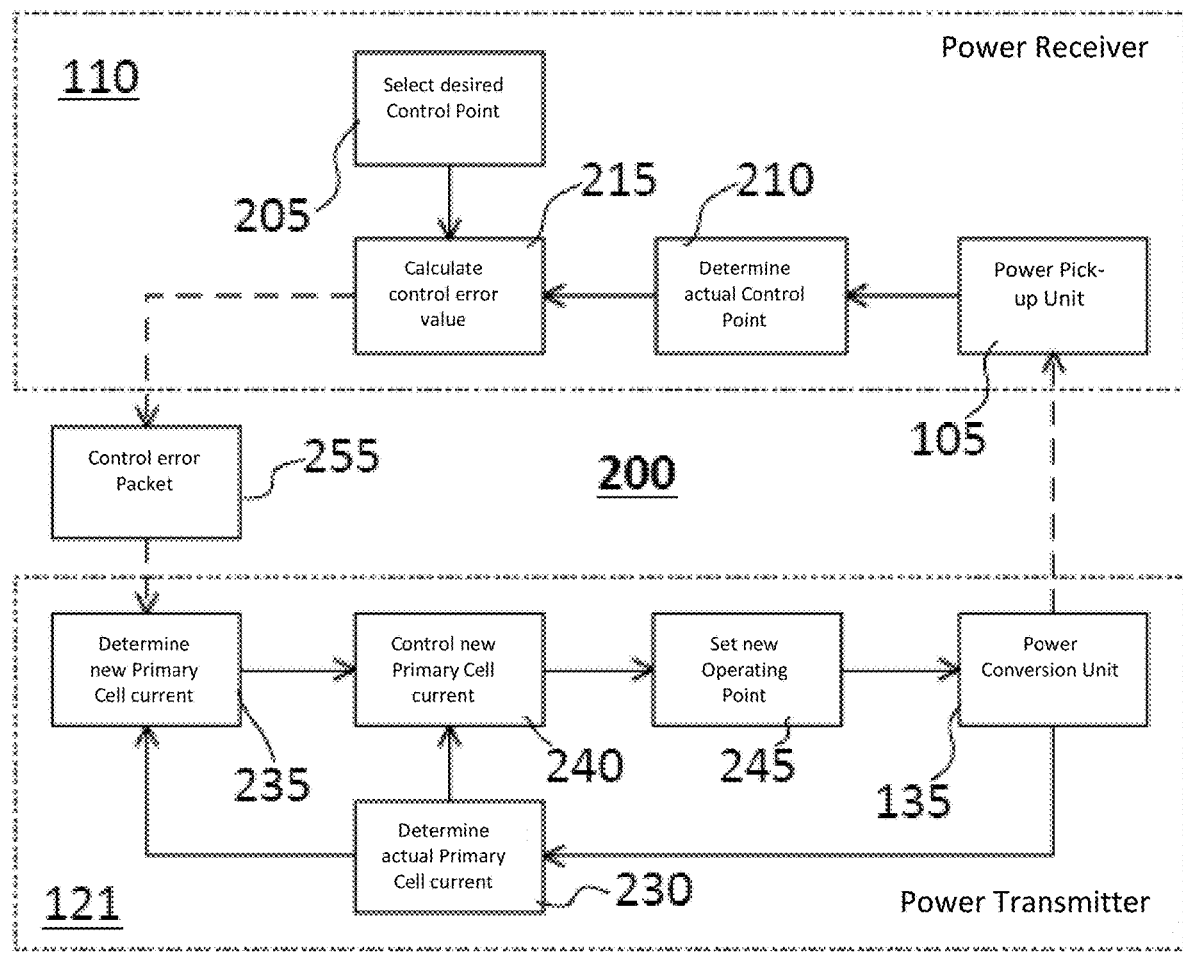
FIG. 4 depicts a schematic diagram of a power transfer control loop for controlling power transfer according to an embodiment.

FIG. 4 illustrates a schematic diagram of a power transfer control loop 200 for controlling power transfer. In an embodiment, at block 205, the power receiver (PRx) subsystem 110 selects a desired control point: a desired output current and/or voltage, a temperature measured somewhere in the electronic device 101, etc. In addition, the power receiver (PRx) subsystem 110 determines at block 210 its actual control point.

The power receiver (PRx) subsystem 110 may use any approach to determine a control point. For example, the power receiver (PRx) subsystem 110 may receive a voltage or current value from the power pick-up (circuit) unit 105. Moreover, the power receiver (PRx) subsystem 110 may change this approach at any time during the power transfer phase. Using the desired control point and actual control point, the power receiver (PRx) subsystem 110 at block 215 calculates a control error value. For example, the power receiver (PRx) subsystem 110 may calculate the control error value by taking the (relative) difference of the two output voltages or currents. The result of taking the (relative) difference being negative would indicate that the power receiver (PRx) subsystem 110 requires less power in order to reach its desired control point and the result of taking the (relative) difference being positive would indicate that the power receiver (PRx) subsystem 110 requires more power in order to reach its desired control point. That is, a negative control error value, when communicated by the power receiver (PRx) subsystem 110 to the power transmitter (PTx) subsystem 121 would direct the power transmitter (PTx) subsystem 121 to increase its operating frequency, or to decrease its voltage if the operating frequency has reached its maximum value, and a positive control error value, when communicated by the power receiver (PRx) subsystem 110 to the power transmitter (PTx) subsystem 121 would direct the power transmitter (PTx) subsystem 121 to increase its voltage, or to decrease its operating frequency if the voltage has reached its maximum value.

However, according to an embodiment, a negative control error value can direct the power transmitter (PTx) subsystem 121 to prevent the power transmitter (PTx) subsystem 121 from further lowering its power switching frequency regardless of the brand and make of the transmitter if an operating frequency condition at the power receiver (PRx) subsystem 110 has already reached a low frequency threshold value, as described in more detail below.

Subsequently, the power receiver (PRx) subsystem 110 transmits this control error value to the power transmitter (PTx) subsystem 121 over a signal bus or like communications channel for receipt at the communications transceiver unit 140 at the power transmitter (PTx) subsystem 121. Such control error value provides input to control (controller) unit 145 at the power transmitter (PTx) subsystem 121.

The control error value can be communicated as a byte word, i.e., a two's complement, signed integer value contained in a message field ranging between −128 ... +127 (inclusive), in a message packet, referred to as Control Error Packet (CEP) 255, that is sent to the power transmitter (PTx) subsystem 121 to control increasing power, decreasing power, or maintaining the power level charge being transferred to the load 199 via magnetic induction. In an embodiment, the CEP message can be transmitted over an PRx-to-PTx communication link as modulated signals on top of the power link that exists. In an embodiment, the bit rate for the PRx-to-PTx communication link is 2 kbps.

As further shown in FIG. 4, upon receiving the control error value in the Control Error Packet (CEP), the power transmitter (PTx) subsystem 121 adjusts its operating point, for example, within a pre-determined time window. At block 230, the control (controller) unit 145 can run methods to determine the actual primary cell current value delivered to the power charge coil 125 for transfer by the power conversion unit 135 of the power transmitter (PTx) subsystem 1121. Then, at block 235, the control (controller) unit 145 uses the control error value from the Control Error Packet (CEP) 255 and the determined actual primary cell current to determine a new primary cell current. After the system stabilizes from the communications of the Control Error Packet (CEP) 255, at block 240, the power transmitter (PTx) subsystem 121 runs methods to control its actual primary cell current towards the determined new primary cell current within a short time window. Within this time window, at block 245, the power transmitter (PTx) unit 110 reaches a new Operating Point: the amplitude, frequency, and duty cycle of the AC voltage that is applied to the power charge coil 125. Subsequently, the power transmitter (PTx) subsystem 121 keeps its Operating Point fixed in order to enable the power receiver (PRx) subsystem 110 to communicate additional control and status information.

To set up power transfer and assist in its control, a power transmitter and power receiver execute a communication protocol with each other. According to the Qi standard, the power receiver uses amplitude shift keying to communicate requests and other information to the power transmitter by modulating its reflected impedance. The power transmitter (PTx) subsystem 121 communicates to the power receiver (PRx) subsystem 110 using frequency shift keying (FSK) in which the power transmitter modulates the operating frequency of the power signal transferred. Such communication provides synchronization and other information to the power receiver by modulating its operating frequency.

Figure 5:
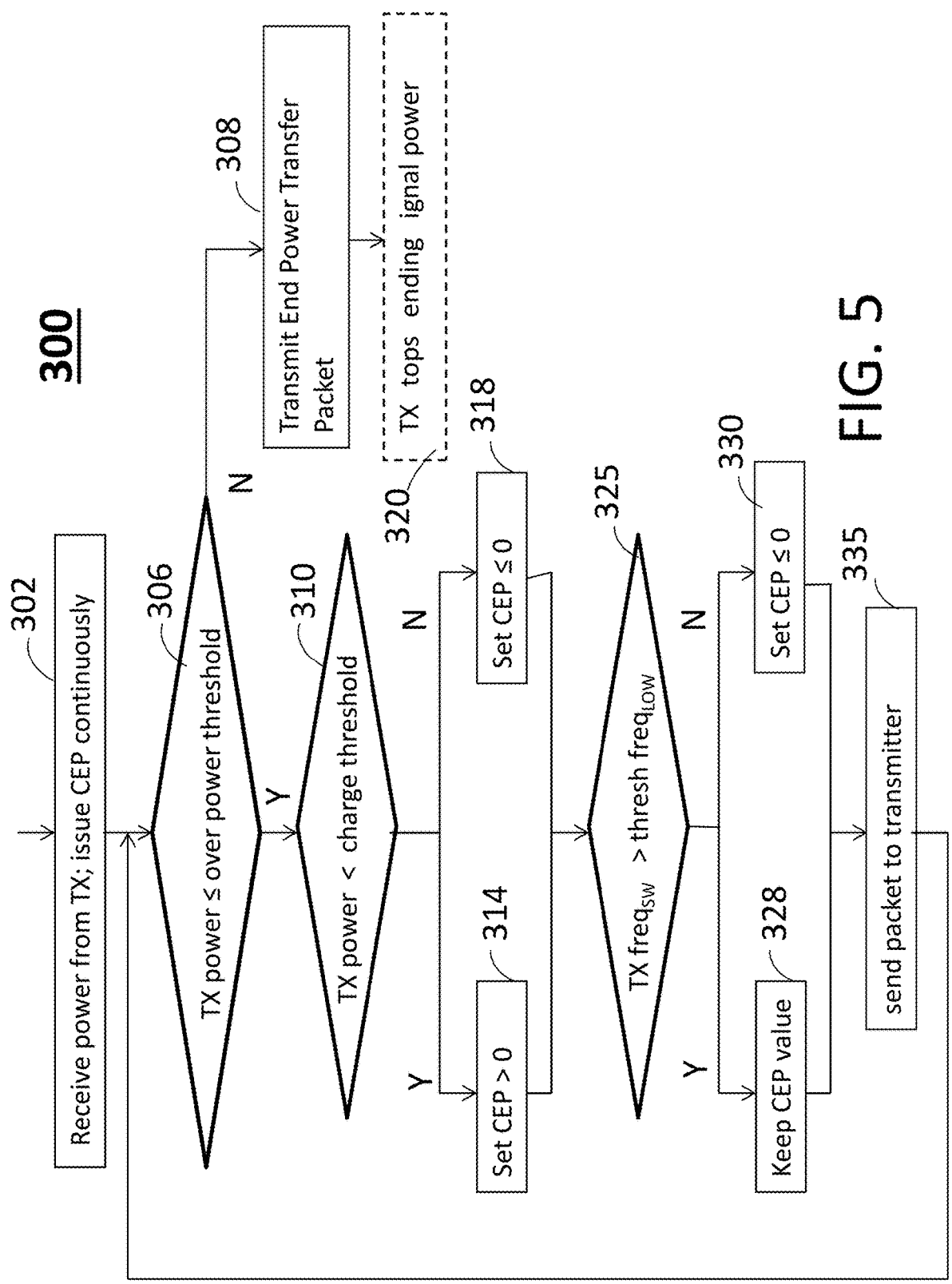
FIG. 5 depicts a power transfer control method run by a controller at a power receiving apparatus in accordance with an embodiment.

FIG. 5 depicts a power transfer control method 300 run by the control (controller) unit 122 at the power receiver (PRx) subsystem 110 for dynamically protecting the power receiver (PRx) subsystem 110 from overvoltage and overpower in accordance with an embodiment.

In the wireless power transfer system 100 illustrated in FIG. 3, power is transferred from the power transmitter (PTx) subsystem 121 contained in the base station 120 to the power receiver (PRx) subsystem 110 contained in the electronic device 101. Before power transfer begins, the power receiver (PRx) subsystem 110 and the power transmitter (PTx) subsystem 121 communicate with each other to establish that the electronic device 101 is indeed capable of being charged, whether it needs to be charged, how much power is required, etc. In short, the communication ensures an appropriate power transfer from the power transmitter (PTx) subsystem 121 to the power receiver (PRx) subsystem 110.

When power transfer begins, the power transmitter (PTx) subsystem 121 runs an alternating current through the power charge coil 125, which generates an alternating magnetic field. This magnetic field is in turn picked up by the receiver coil 115 inside the power receiver (PRx) subsystem 110 and transformed by a power converter back into an alternating electrical current that can be used, for example, to charge a battery.

As indicated at step 302, in a power transfer control phase, the power transmitter (PTx) subsystem 121 continues to provide power to the power receiver (PRx) subsystem 110, adjusting its primary cell current in response to control data that the power transmitter (PTx) subsystem 121 receives from the power receiver (PRx) subsystem 110. In an embodiment, the power receiver (PRx) subsystem continuously sends the control error packets (CEPs) to the power transmitter (PTx) subsystems 121 regardless of the relationship between charge voltage used to control the power signal transmitted and a target charge value. Throughout this phase, the power receiver (PRx) subsystem 110 controls the power transfer from the power transmitter (PTx) subsystem 121, by means of control error data value in the Control Error Packet (CEP) 255 that the power receiver (PRx) subsystem 110 transmits to the power transmitter (PTx) subsystem 121. For the Control Error Packet (CEP) having control error values greater than 0, the power transmitter (PTx) subsystem 121 responsively increases its voltage to increase the power transferred. However, if the voltage has reached its maximum value, the power transmitter (PTx) subsystem 121 decreases its operating frequency to increase the power transferred.

The power receiver (PRx) subsystem 110 receives the magnetically induced power and continuously monitors the state of the power at the power receiver (PRx) subsystem 110. For example, a charge voltage and the current through a rectifier circuit can be sampled periodically and digitized by an analog-to-digital converter 109 as shown in FIG. 3. The digital equivalents of the voltage and current are supplied to a microprocessor control unit 122 as shown in FIG. 3, and by running internal control logic embodied as an application 130 in firmware, the microprocessor control unit 122 decides whether the loading conditions indicate that a change in the operating point is required. If the load is heavy enough to bring the charge voltage below a target, the power transmitter (PTx) subsystem 121 is instructed to increase its voltage or move its frequency lower, e.g., closer to resonance. If the charge voltage is higher than its target, the power transmitter (PTx) subsystem 121 is instructed to increase its frequency. In an embodiment, the control (controller) unit 122 measures the rectifier voltage and sends Control Error Packets (CEPs) to the power transmitter (PTx) subsystem 121 to adjust the rectifier voltage to the level required to maximize the efficiency of the power receiver (PRx) subsystem 121.

At step 306, a first determination is made as to whether the charge voltage obtained from the transmitted PTx power signal is below an over power threshold. If the transmitted PTx power signal reaches or exceeds an over power threshold, the power receiver (PRx) subsystem 110, at step 308, generates and transmits an End Power Transfer Packet containing an End Power Transfer Code, which is used to instruct the power transmitter (PTx) subsystem 121 to terminate power transfer operations. On receipt of the End Power Transfer Packet containing this value, the power transmitter (PTx) subsystem 121 removes the power signal and effectively terminates the power charge transfer operations with the electronic device 101. Otherwise, returning to step 306, while the charge voltage obtained from the transmitted PTx power signal is below the over power threshold, e.g., is at a normal operating point, the process proceeds to step 310 where a further determination is made as to whether the charge voltage obtained from the transmitted PTx power signal is less than a target charge threshold value. If at step 310, it is determined that the charge voltage obtained from the transmitted PTx power signal is less than the target charge threshold value, then at step 314 the power receiver (PRx) subsystem 110 sets and periodically transmits a Control Error Packet (CEP) with a control error value greater than zero. The power transmitter (PTx) subsystem 121 responsively increases its voltage to increase the power transferred, or the power transmitter (PTx) subsystem 121 decreases its operating frequency thereby decreasing the frequency of the AC power signal transferred depending upon the received control error value. In either event, power receiver (PRx) subsystem 110 continuously transmits Control Error Packets (CEPs) with a control error value greater than zero. Otherwise, at step 310, if it is determined that the charge voltage obtained from the transmitted PTx power signal is equal to or greater than a target charge threshold value, then at step 318 the power receiver (PRx) subsystem 110 sets and periodically transmits a Control Error Packet (CEP) with a control error value less than or equal to zero. The power transmitter (PTx) subsystem 121 responsively decreases its voltage to decrease the power transferred, or the power transmitter (PTx) subsystem 121 increases its operating frequency thereby increasing the frequency of the AC power signal transferred depending upon the received control error value. In either event, power receiver (PRx) subsystem 110 continuously transmits Control Error Packets (CEPs) with a control error value less than or equal to zero.

Regardless of the value of the Control Error Packets (CEPs) being sent to control transmitter operations at the power transmitter (PTx) subsystem 121, the process continues to step 325 where the control (controller) unit 122 at the power receiver (PRx) subsystem 110 makes a determination as to a frequency characteristic of the received AC power signal transferred, i.e., the switched frequency at the transmitting apparatus (TX $freq_{SW}$). In an embodiment, the power receiver (PRx) subsystem 110 can include a frequency detector (circuit) unit 107, as shown in FIG. 3, that can detect the received frequency of the transferred power signal at the synchronous rectifier of the power pick-up (circuit) unit 105. In another example, the frequency detection can be determined by the power receiver (PRx) subsystem 110 obtaining information from a communication packet transmitted from the power transmitter (PTx) subsystem 121. The value of the frequency of the transferred power signal is converted to a digital value TX $freq_{SW}$ and is compared to a lowest frequency threshold value (thresh $freq_{LOW}$) corresponding to a lowest frequency of any transferred power signal that ensures protection of the power receiver (PRx) subsystem 110 against an over voltage/over power condition. The lowest frequency threshold value is independent of the power transmitter (PTx) subsystem 121. Further the lowest frequency threshold value can be a pre-determined, fixed value or a variable that is calculated by the power receiver (PRx) subsystem 110.

At step 325, if it is determined that the value of TX $freq_{SW}$ is greater than the value of the lowest frequency threshold $freq_{LOW}$, the process continues to step 328 where the control error value of the control error packet (CEP) is maintained and, at step 335, a Control Error Packet (CEP) is transmitted to the power transmitter (PTx) subsystem 121 and the process returns to step 306 to repeat the monitoring steps 306 and 310 while continuing to generate Control Error Packets (CEPs) having control error values greater than zero. Otherwise, if it is determined at step 325 that the value of TX $freq_{SW}$ is less than or equal to the value of the lowest frequency threshold $freq_{LOW}$ indicating the receiver coil 115 current frequency is lower than the threshold set in power receiver (PRx) subsystem 110, then at step 330 the control (controller) unit 122 of the power receiver (PRx) subsystem 110 sets the control error value of the CEP packet to a non-positive number and at step 335 generates and initiates sending a Control Error Packet (CEP) to the power transmitter (PTx) subsystem 121 with the non-positive control error value in order to prevent the power transmitter (PTx) subsystem 121 from further lowering its switching frequency regardless of the brand and make of the base station 120. In this way, at step 330, the power receiver (PRx) subsystem 110 actively prevents asking the power transmitter (PTx) subsystem 121 for more power.

The elements illustrated in the drawings and described above as functional blocks for performing various processes can be implemented hardware-wise by a CPU, a memory, and other circuits, and software-wise by a memory or other non-transitory computer-readable storage medium having a program stored thereon or the like. Accordingly, it is to be understood by those skilled in the art that these functional blocks can be implemented in various forms including being implemented by hardware alone, software alone, or a combination of hardware and software.

Besides mobile devices, wireless charging according to embodiments herein can be used in many other consumer product categories—smart watches, power banks, Bluetooth headsets, cameras, electric shavers, etc. Virtually any device that uses a rechargeable battery can be designed to use wireless power charging technique described herein. Further, wireless power transfer technique described herein is not limited to charging batteries. It can also be used to power devices that require electric current and will remain stationary while in use, such as desktop lamps or speakers.

Moreover, further examples of a standalone wireless charger can include, but is not limited to: charging pads, which lie flat on a table or desktop; charging stands, which are designed to hold a smart phone upright in a viewing position while charging; and power banks, which are similar to charging pads, but contain internal batteries as a portable power source Although the present invention made by the inventors have been specifically described based on the embodiments, the present invention is not limited to the embodiment described above, and various modifications can be made without departing from the gist thereof.

What is claimed is:

1. An apparatus for controlling power receiving operation, the apparatus comprising:
   a controller in a power receiving circuit configured to:
   compare a frequency of an electric current generated by a voltage induced in a coil of the power receiving circuit by a magnetic field generated by a power transmitting apparatus, against a frequency threshold to determine whether the frequency is equal to or below the frequency threshold; and
   in response to determining that the frequency is equal to or below the frequency threshold, control a communications circuit to communicate a control command message instructing the power transmitting apparatus to modify a power charge signal used to provide the magnetic field in a manner for protecting the apparatus.

2. The apparatus according to claim 1,
   wherein the controller is configured to:
   control the communication circuit to communicate a prior control command message instructing the power transmitting apparatus to modify the power charge signal to increase the power transmitted to the power receiving circuit; and after the prior control command message is communicated, compare the frequency of the electric current generated against the frequency threshold.

3. The apparatus according to claim 2,
wherein each of the prior control command message and the control command message is a control error packet,
wherein the control error packet of the prior control command message has a value greater than zero, and
wherein the control error packet of the control command message has a value equal to or less than zero.

4. The apparatus according to claim 1,
wherein the control command message instructs the power transmitting apparatus to maintain a frequency of the power charge signal.

5. The apparatus according to claim 1,
wherein the control command message instructs the power transmitting apparatus to modify the power charge signal to increase a frequency of the power charge signal used to provide the magnetic field in the manner for protecting the apparatus.

6. The apparatus according to claim 1,
wherein the modified power charge signal provides the magnetic field in a manner that protects the apparatus from an over voltage/over power condition.

7. The apparatus according to claim 1, further comprising:
a receiver coil configured to interact with the magnetic field to generate the electric current; and
the power receiving circuit coupled to the receiver coil to receive the electric current generated.

8. The apparatus according to claim 7,
wherein the power receiving circuit comprises:
a frequency detector circuit coupled with the receiver coil and configured to determine the frequency of the electric current generated.

9. An electronic device comprising:
the apparatus according to claim 1; and
a load configured to be driven by the electric current generated.

10. A non-transitory computer-readable storage medium storing a program for controlling power receiving operation of an apparatus, wherein the program causes a processor to at least perform:
comparing, in a power receiving circuit, a frequency of an electric current generated by a voltage induced in a coil of the power receiving circuit by a magnetic field generated by a power transmitting apparatus, against a frequency threshold to determine whether the frequency is equal to or below the frequency threshold; and
in response to determining that the frequency is equal to or below the frequency threshold, controlling a communications circuit to communicate a control command message instructing the power transmitting apparatus to modify a power charge signal used to provide the magnetic field in a manner for protecting the apparatus.

11. The non-transitory computer-readable storage medium according to claim 10, comprising:
controlling the communication circuit to communicate a prior control command message instructing the power transmitting apparatus to modify the power charge signal to increase the power transmitted to the power receiving circuit; and
after the prior control command message is communicated, comparing the frequency of the electric current generated against the frequency threshold.

12. The non-transitory computer-readable storage medium according to claim 11,
wherein each of the prior control command message and the control command message is a control error packet,
wherein the control error packet of the prior control command message has a value greater than zero, and
wherein the control error packet of the control command message has a value equal to or less than zero.

13. The non-transitory computer-readable storage medium according to claim 10,
wherein the control command message instructs the power transmitting apparatus to maintain a frequency of the power charge signal.

14. The non-transitory computer-readable storage medium according to claim 10,
wherein the control command message instructs the power transmitting apparatus to modify the power charge signal to increase a frequency of the power charge signal used to provide the magnetic field in the manner for protecting the apparatus.

15. The non-transitory computer-readable storage medium according to claim 10,
wherein the modified power charge signal provides the magnetic field in a manner that protects the apparatus from an over voltage/over power condition.

16. A method for controlling power receiving operation of an apparatus, the method comprising:
comparing, by a power receiving circuit, a frequency of an electric current generated by a voltage induced in a coil of the power receiving circuit by a magnetic field generated by a power transmitting apparatus, against a frequency threshold to determine whether the frequency is equal to or below the frequency threshold; and
in response to determining that the frequency is equal to or below the frequency threshold, controlling a communications circuit to communicate a control command message instructing the power transmitting apparatus to modify a power charge signal used to provide the magnetic field in a manner for protecting the apparatus.

17. The method according to claim 16, comprising:
controlling the communication circuit to communicate a prior control command message instructing the power transmitting apparatus to modify the power charge signal to increase the power transmitted to the power receiving circuit; and
after the prior control command message is communicated, comparing the frequency of the electric current generated against the frequency threshold.

18. The method according to claim 17,
wherein each of the prior control command message and the control command message is a control error packet,
wherein the control error packet of the prior control command message has a value greater than zero, and
wherein the control error packet of the control command message has a value equal to or less than zero.

19. The method according to claim 17,
wherein the control command message instructs the power transmitting apparatus to maintain a frequency of the power charge signal.

20. The method according to claim 17,
wherein the control command message instructs the power transmitting apparatus to modify the power charge signal to increase a frequency of the power charge signal used to provide the magnetic field in the manner for protecting the apparatus.

\* \* \* \* \*